United States Patent

Preston

Patent Number: 6,094,283
Date of Patent: Jul. 25, 2000

[54] HOLOGRAPHIC DISPLAY WITH SWITCHABLE ASPECT RATIO

[75] Inventor: Alan R. Preston, Swindon, United Kingdom

[73] Assignee: DigiLens, Inc., Sunnyvale, Calif.

[21] Appl. No.: 09/405,444

[22] Filed: Sep. 23, 1999

Related U.S. Application Data

[60] Provisional application No. 60/104,475, Oct. 16, 1998.

[51] Int. Cl.[7] .................................................. G02B 5/32
[52] U.S. Cl. ............................ 359/15; 359/13; 359/22; 359/24; 359/462; 345/8; 348/53
[58] Field of Search .................................. 359/13, 15, 22, 359/23, 24, 33, 462, 466; 345/7, 8, 9; 348/51, 53

[56] References Cited

U.S. PATENT DOCUMENTS

| H738 | 2/1990 | McManus et al. . | |
|---|---|---|---|
| 3,807,829 | 4/1974 | Close . | |
| 4,790,613 | 12/1988 | Moss . | |
| 4,807,951 | 2/1989 | Moss . | |
| 4,932,731 | 6/1990 | Suzuki et al. . | |
| 4,981,332 | 1/1991 | Smith . | |
| 5,035,474 | 7/1991 | Moss et al. . | |
| 5,044,709 | 9/1991 | Smith et al. | 359/13 |
| 5,151,724 | 9/1992 | Kikinis | 357/17 |
| 5,278,532 | 1/1994 | Hegg et al. | 345/7 |
| 5,291,314 | 3/1994 | Agranat et al. . | |
| 5,305,124 | 4/1994 | Chern et al. | 359/13 |
| 5,319,492 | 6/1994 | Dorn et al. | 359/296 |
| 5,424,866 | 6/1995 | Kikinis | 359/292 |
| 5,440,428 | 8/1995 | Hegg et al. | 359/630 |
| 5,471,327 | 11/1995 | Tedesco et al. | 359/15 |
| 5,506,701 | 4/1996 | Ichikawa | 359/15 |
| 5,521,724 | 5/1996 | Shires | 359/22 |
| 5,537,232 | 7/1996 | Biles | 359/15 |
| 5,539,542 | 7/1996 | Picoli et al. | 359/6 |
| 5,544,143 | 8/1996 | Kay et al. | 369/109 |
| 5,581,378 | 12/1996 | Kulick et al. | 359/9 |
| 5,612,709 | 3/1997 | Sudo et al. | 359/462 |
| 5,680,231 | 10/1997 | Grinberg et al. | 359/15 |
| 5,692,077 | 11/1997 | Stone et al. | 385/16 |
| 5,696,749 | 12/1997 | Brazas, Jr. et al. | 369/109 |
| 5,698,343 | 12/1997 | Sutherland et al. | 430/1 |
| 5,703,702 | 12/1997 | Crane et al. | 359/1 |
| 5,719,690 | 2/1998 | Burland et al. | 359/4 |
| 5,744,267 | 4/1998 | Meerholz et al. | 430/1 |
| 5,771,320 | 6/1998 | Stone | 385/16 |
| 5,777,760 | 7/1998 | Hays et al. | 359/7 |
| 5,793,504 | 8/1998 | Stoll | 359/11 |
| 5,796,499 | 8/1998 | Wenyon | 359/15 |
| 5,808,759 | 9/1998 | Okamori et al. | 359/15 |
| 5,825,448 | 10/1998 | Bos et al. | 349/128 |
| 5,825,539 | 10/1998 | Hoshi | 359/462 |
| 5,844,709 | 12/1998 | Rabinovich et al. | 359/248 |

FOREIGN PATENT DOCUMENTS

WO 98/04650  2/1998  WIPO ......................... C09K 19/00

*Primary Examiner*—Cassandra Spyrou
*Assistant Examiner*—Darren E. Schuberg
*Attorney, Agent, or Firm*—Ritter Van Pelt & Yi, L.L.P.

[57] ABSTRACT

A holographic display system comprising left and right optical systems is disclosed. The optical systems each comprise an image display operable to display an input image and first and second holographic devices. The first holographic device is operable to project the input image to overlap with the input image projected from the other of the left and right optical systems to form a resultant image with a first aspect ratio. The second holographic device is operable to project the input image to overlap with the input image projected from the other of the left and right optical systems to form a resultant image with a second aspect ratio, different from the first aspect ratio. A method of changing the aspect ratio of an image is also disclosed.

20 Claims, 4 Drawing Sheets

HOLOGRAPHIC DISPLAY WITH SWITCHABLE ASPECT RATIO

RELATED APPLICATION

The present application claims the benefit of U.S. Provisional Application Serial No. 60/104,475, filed Oct. 16, 1998.

FIELD OF THE INVENTION

The present invention relates generally to electronic displays, and more particularly, to electronic displays with switchable holographic optical elements.

BACKGROUND OF THE INVENTION

Head mounted displays have received considerable attention as a technique for displaying high magnification, large field of view and high definition virtual images. The head mounted display generally includes a support member for mounting the display on a head of a user and various optical and display components. The components are arranged to magnify an image displayed on a compact image display panel such as a liquid crystal display (LCD) and to display the magnified image ahead of the user through the optical system. The user typically does not directly observe an image displayed on a monitor or screen, but instead observes a magnified virtual image converted from the image displayed on the image display panel. The head mounted display thus provides a compact arrangement for displaying to the user a larger image than displayed on a small display panel.

Two current areas of development for head mounted display technology are data display for computer applications and video display for entertainment. Computer displays are typically configured to provide an image field with a 4:3 aspect ratio while video displays are typically configured to provide an image field with a 16:9 aspect ratio. Since the two technologies present different requirements for the displayed image format, two different conventional head mounted display devices are required for data display and video display.

SUMMARY OF THE INVENTION

A holographic display system of the present invention is operable to display an image with more than one aspect ratio. According to one embodiment of the present invention, the holographic display system comprises left and right optical systems each comprising an image display operable to display an input image, and first and second holographic devices. The first holographic device is operable to project the input image to overlap with the input image projected from the other of the left and right optical systems to form a resultant image with a first aspect ratio. The second holographic device is operable to project the input image to overlap with the input image projected from the other of the left and right optical systems to form a resultant image with a second aspect ratio, different from the first aspect ratio.

A method according to an embodiment of the present invention is for changing an aspect ratio in a display system. The display system comprises a first holographic system operable to display an image with a first aspect ratio and a second holographic system operable to display the image with a second aspect ratio different from the first aspect ratio. The method generally comprises switching on the first holographic system so that the holographic system diffracts light passing therethrough to form an image with the first aspect ratio and switching off the second holographic system so that the second holographic system allows light to pass therethrough without diffraction thereof.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
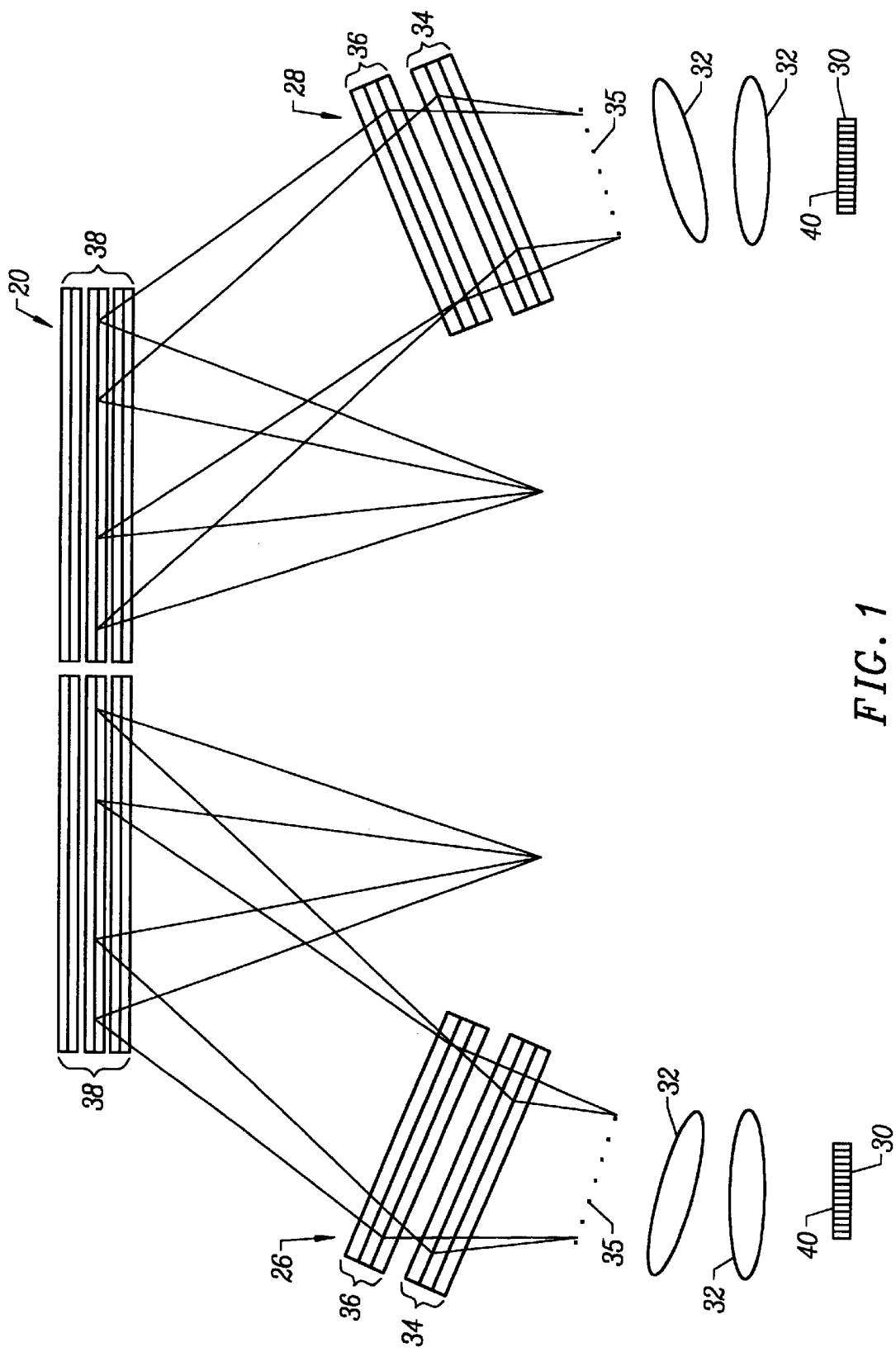
FIG. 1 is a schematic of a holographic display system of the present invention.

Referring now to the drawings, and first to FIG. 1, a holographic display system, generally indicated at 20, is shown. The holographic display system 20 is operable to switch between two different aspect ratios. The aspect ratio is defined as the width to height ratio of the resulting image. For example, a typical computer monitor has an aspect ratio of 4:3 while movie screens and HDTV (high definition TV) have an aspect ratio of 16:9. The display system may be initially configured to provide a 4:3 aspect ratio for use in data display and then switched to a 16:9 aspect ratio for use as a movie screen, without changing hardware within the system. It is to be understood that the system may be used to provide an image with an aspect ratio different than 4:3 or 16:9 and may also be configured to switch between more than two aspect ratios. As further described below, the aspect ratio is changed by selectively deenergizing electrodes of a first holographic device and energizing electrodes of a second holographic device.

Figure 2A:
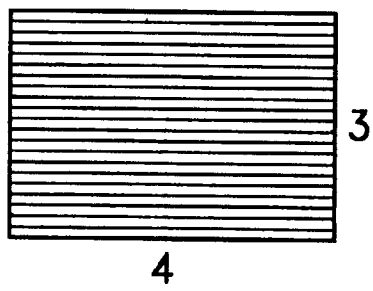
FIG. 2A is a schematic illustrating a left eye image field having a width to height ratio of 4:3.
Figure 2B:
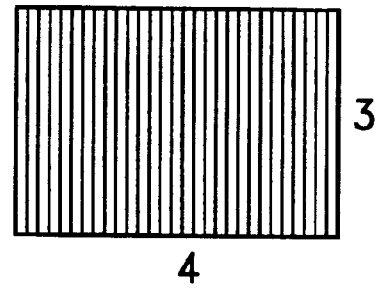
FIG. 2B is a schematic illustrating a right eye image field having a width to height ratio of 4:3.
Figure 3:
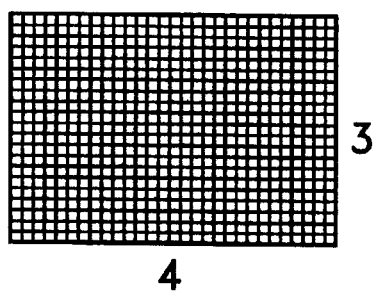
FIG. 3 is a schematic illustrating a composite image formed from 100% overlap of the left and right eye image fields of FIGS. 2A and 2B.
Figure 4:
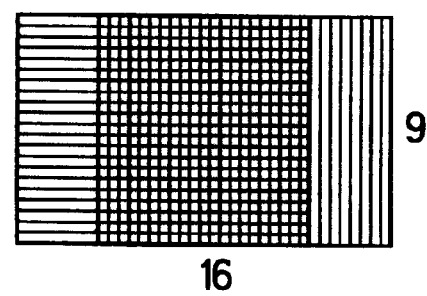
FIG. 4 is a schematic illustrating a composite image formed from partial horizontal overlap of the left and right eye image fields of FIGS. 2A and 2B.

FIGS. 2A, 2B, 3, and 4 illustrate the relationship between binocular overlap and aspect ratio for a display format with a 4:3 aspect ratio and a 16:9 aspect ratio. A left eye image field is shown in FIG. 2A and a right eye image field is shown in FIG. 2B. Both the left and right eye image fields have a width to height ratio of 4:3. FIG. 3 illustrates a composite image having a width to height ratio of 4:3. The image is formed from 100% vertical and horizontal overlap of the left and right eye images. The composite image shown in FIG. 4 has a width to height ratio of 16:9 and is formed from approximately 100% vertical overlap and approximately 66% horizontal overlap of the left and right eye images, assuming each left or right eye image is equivalent to 3×4 units. The image is formed from the overlap area of width ⅔×4 units plus the non-overlapped areas on opposite sides of the overlap area, each having a width of ⅓×4 units (FIG. 4). The overall width is therefore 4/3×4 units (or 16/3) resulting in an aspect ratio of 16/3:3, which is equivalent to 16:9.

The head mounted display includes a headpiece (not shown) designed to be worn by a viewer and the display system 20 for producing wide-angle, electronically generated virtual images to each eye of the viewer, for example. The headpiece includes a frame configured to fit over a viewer's head and a mask which fits over the viewer's eye region, as is well known by those skilled in the art.

As shown in FIG. 1, the display system 20 of one embodiment of the present invention, includes a left optical system, generally indicated at 26, and a right optical system, generally indicated at 28. The left and right optical systems 26, 28 are mirror images of each other and generally identical in all other aspects. Therefore, in the following description, only the left optical system 26 will be described in detail.

The left optical system 26 includes an input image display panel 30, a lens group comprising two lenses 32, a narrow field beam holographic device 34, a wide field beam holographic device 36, and a reflective eye piece 38 for projecting a resultant image to the viewer. A light source (not shown) is positioned to project a light onto the input image display panel 30 which then projects an input image to the lens group. The input image is amplified by the lens group to form an intermediate image at an intermediate surface 35. The intermediate image is then re-imaged by either the narrow field beam holographic device 34 or the wide field beam holographic device 36 which magnifies the intermediate image to form a resulting image. The resulting image (i.e., the final image presented to the eye) is preferably a virtual image which appears to be formed a distance in front of the eye (e.g., several meters for a wearable display). It is to be understood that the arrangement and configuration of components may be different than shown in FIG. 1 without departing from the scope of the invention. For example, the intermediate image may be formed at a different location than shown herein, or the system may be configured such that it is not necessary to form an intermediate image.

The light source may be any high intensity white light source (such as a conventional LCD backlight, for example) or alternatively it could be based on red, green, and blue high intensity LEDs (Light Emitting Diodes) or red, green, and blue lasers. The light source is positioned to direct light at an angle onto a front surface 40 of the input image display 30.

The input image display 30 generates video or graphic information and may comprise a liquid crystal display (LCD) panel, or any other spatial light modulator (SLM) which reflects light produced externally. The input image display may be a miniature reflective LCD having either a nematic or ferroelectric material on a silicon backplane, for example. The input image display 30 may also be based transmissive display technologies. Preferably the display is color illuminated sequentially using separate red, green, and blue sources or, alternatively, a white source combined with a color sequential filter. The latter could be based on electromechanical techniques involving band pass filters which are rotated or displaced in some manner in front of the source. A color filter (not shown) having three reconfigurable holographic elements (as further described below with respect to the holographic device) is preferably interposed between the LCD panel and the light source to display color images. Each of the reconfigurable holographic optical elements is holographically designed to diffract only certain color light (i.e., red, blue, or green) toward the display panel 30. The holographic optical elements are sequentially activated so that the projected input images will appear to be displayed as a composite color image.

A micro-electromechanical system, such as a Digital Light Processor (DLP) using a Digital Micromirror Device™ (DMD) available from Texas Instruments, may also be used as the input image display panel 30. The DMD is a micro mechanical silicon chip having movable mirrors which reflect light to create high quality images. An image is formed on the reflective surface of the DMD by turning the mirrors on or off digitally at a high rate of speed. Color is added to the image by filtering light through a color system. The color system may comprise a light source which directs white light through a condenser lens and a red, green, and blue color filter and then onto the surface of the DMD chip, for example. Mirrors are turned on or off depending upon where and how much of each color is needed per pixel.

The input image display panel 30 may also be a diffractive display device such as a Grating Light Valve™ (GLV) available from Silicon Light Machines (formerly Echelle, Inc.). The GLV uses micro-electromechanical systems to vary how light is reflected from multiple ribbon structures which can move small distances to create a grating which selectively diffracts specified wavelengths of light. Picture elements (pixels) are formed on the surface of a silicon chip and become the image source for display projection. A white light source is filtered sequentially through red, green, and blue filters. By synchronizing the image data stream's red, green, and blue pixel data with the appropriate filtered source light, combinations of red, green, and blue light are diffracted to the lens group for projection of the image into the holographic device. It is to be understood that display panels other than those described herein may be used without departing from the scope of the invention.

As shown in FIG. 1, the lens group comprises two optical lenses 32. The lenses 32 magnify the input image to form the intermediate image on the intermediate image surface 35. The lenses 32 are configured and positioned to provide appropriate focal length and optical characteristics. It is to be understood that the number and configuration of lenses 32 may be different than shown herein. Additional optical elements may be provided to correct for aberrations and for relay optics and display illumination optics, as is well known by those skilled in the art. For example, the lenses may include cylinders, prisms, and off-axis aspheric elements to correct for aberrations due to the off-axis, non-symmetric nature of the display system.

After passing through the lenses 32, the image passes through the narrow field beam holographic device 34 and then through the wide field beam holographic device 36. The beams will pass through one of the holographic devices 34, 36 as if the device were transparent (i.e., the beams will not be diffracted) and will be diffracted as they pass through the other holographic device, depending on which device is active. The holographic devices 34, 36 can be individually switched from a diffracting state (active state) to a passive state and from the passive state to the diffracting state. Preferably, only one of the holographic devices 34, 36 is in a diffracting state at a time. The holographic device which is in the diffracting state is the active device (i.e., the device which determines the aspect ratio of the resultant image).

The display system 20 uses the selective light directing ability of the electrically switchable holographic devices 34, 36 to create the resultant image with a selected aspect ratio. When a specific aspect ratio is desired, the holographic device 34, 36 that provides the required horizontal overlap between the left and right eye images is selected. For example, if the wide field beam holographic device 36 is in the diffracting state and the narrow field beam holographic device 34 is in the passive state, the aspect ratio will be 16:9. Similarly, if the narrow field beam holographic device 34 is in the diffracting state and the wide field beam holographic device 36 is in the passive state, the aspect ratio will be 4:3.

Figure 5:
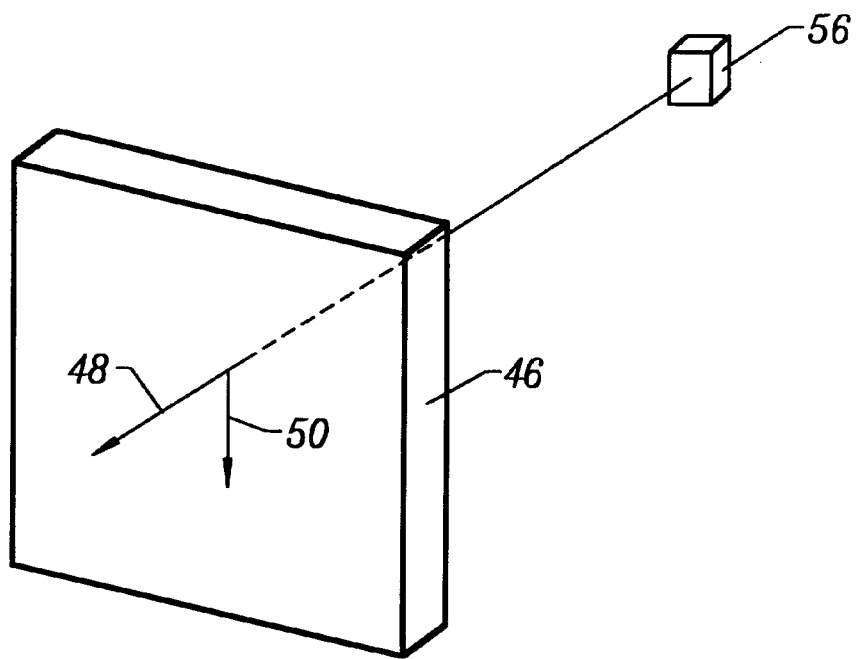
FIG. 5 is a perspective view of a holographic optical element and light source of the display system of FIG. 1.

Each switchable holographic device 34, 36 comprises one or more holographic optical elements 46 which are selectively activated and deactivated to transmit the resultant image which is formed by sequentially manipulating different colors. The holographic optical element 46 includes a hologram interposed between two electrodes 52. The hologram is used to control transmitted light beams based on the principles of diffraction. The hologram selectively directs an incoming light beam from a light source 56 either towards or away from a viewer and selectively diffracts light at certain wavelengths into different modes in response to a voltage applied to the electrodes 52. Light passing through the hologram in the same direction as the light is received from the light source 56 is referred to as the zeroth (0th) order mode 48 (FIG. 5). When no voltage is applied to the electrodes 52, liquid crystal droplets within the holographic optical element 46 are oriented such that the hologram is present in the element and light is diffracted from the zeroth order mode to a first (1st) order mode 50 of the hologram. When a voltage is applied to the holographic optical element 46, the liquid crystal droplets become realigned effectively erasing the hologram, and the incoming light passes through the holographic optical element in the zeroth order mode 48.

It is to be understood that the holographic optical element 46 may also be reflective rather than transmissive as shown in FIG. 5 and described above. In the case of a reflective holographic optical element, the arrangement of the holographic device and optical components would be modified to utilize reflective properties of the hologram rather than the transmissive properties described herein.

The light that passes through the hologram is modulated by interference fringes recorded in the hologram and diffracted to form an image. Depending on the recording, the hologram is able to perform various optical functions which are associated with traditional optical elements, such as lenses and prisms, as well as more sophisticated optical operations. The hologram may be configured to perform operations such as deflection, focusing, or color filtering of the light, for example.

The holograms are preferably recorded on a photopolymer/liquid crystal composite material (emulsion) such as a holographic photopolymeric film which has been combined with liquid crystal, for example. The presence of the liquid crystal allows the hologram to exhibit optical characteristics which are dependent on an applied electrical field. The photopolymeric film may be composed of a polymerizable monomer having dipentaerythritol hydroxypentacrylate, as described in PCT Publication, Application Serial No. PCT/US97/12577, by Sutherland et al. The liquid crystal may be suffused into the pores of the photopolymeric film and may include a surfactant.

The refractive properties of the holographic optical element 46 depend primarily on the recorded holographic fringes in the photopolymeric film. The interference fringes may be created by applying beams of light to the photopolymeric film. Alternatively, the interference fringes may be artificially created by using highly accurate laser writing devices or other replication techniques, as is well known by those skilled in the art. The holographic fringes may be recorded in the photopolymeric film either prior to or after the photopolymeric film is combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the switchable holographic optical elements. Recording of the hologram may be accomplished by a traditional optical process in which interference fringes are created by applying beams of light. Alternatively, the interference fringes may be artificially created by using highly accurate laser writing devices or other optical replication techniques. As further described below, the optical properties of the holographic optical element primarily depend on the recorded holographic fringes in the photopolymeric film.

Figure 6:
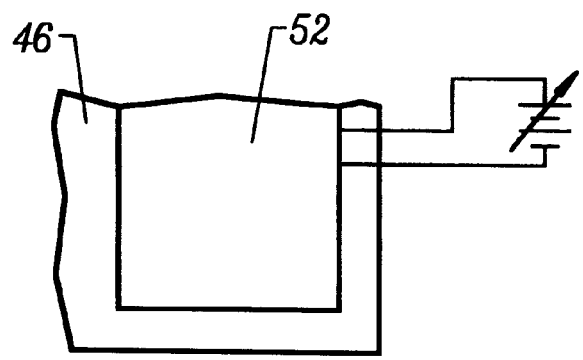
FIG. 6 is a partial front view of the holographic optical element of FIG. 5 illustrating an electrode and an electric circuit of the holographic optical element.

The electrodes (electrode layers) 52 are positioned on opposite sides of the emulsion and are preferably transparent so that they do not interfere with light passing through the hologram. The electrodes 52 may be formed from a vapor deposition of Indium Tin Oxide (ITO) which typically has a transmission efficiency of greater than 80%, or any other suitable substantially transparent conducting material. The electrodes 52 are connected to an electric circuit 58 operable to apply a voltage to the electrodes, to generate an electric field (FIG. 6). Initially, with no voltage applied to the electrodes 52, the hologram is in the diffractive (active) state and the holographic optical element 46 diffracts propagating light in a predefined manner. When an electrical field is generated in the hologram by applying a voltage to the electrodes 52 of the holographic optical element 46, the operating state of the hologram switches from the diffractive state to the passive state and the holographic optical element does not optically alter the propagating light. It is to be understood that the electrodes may be different than described herein. For example, a plurality of smaller electrodes may be used rather than two large electrodes which substantially cover surfaces of the holograms.

Figure 7:
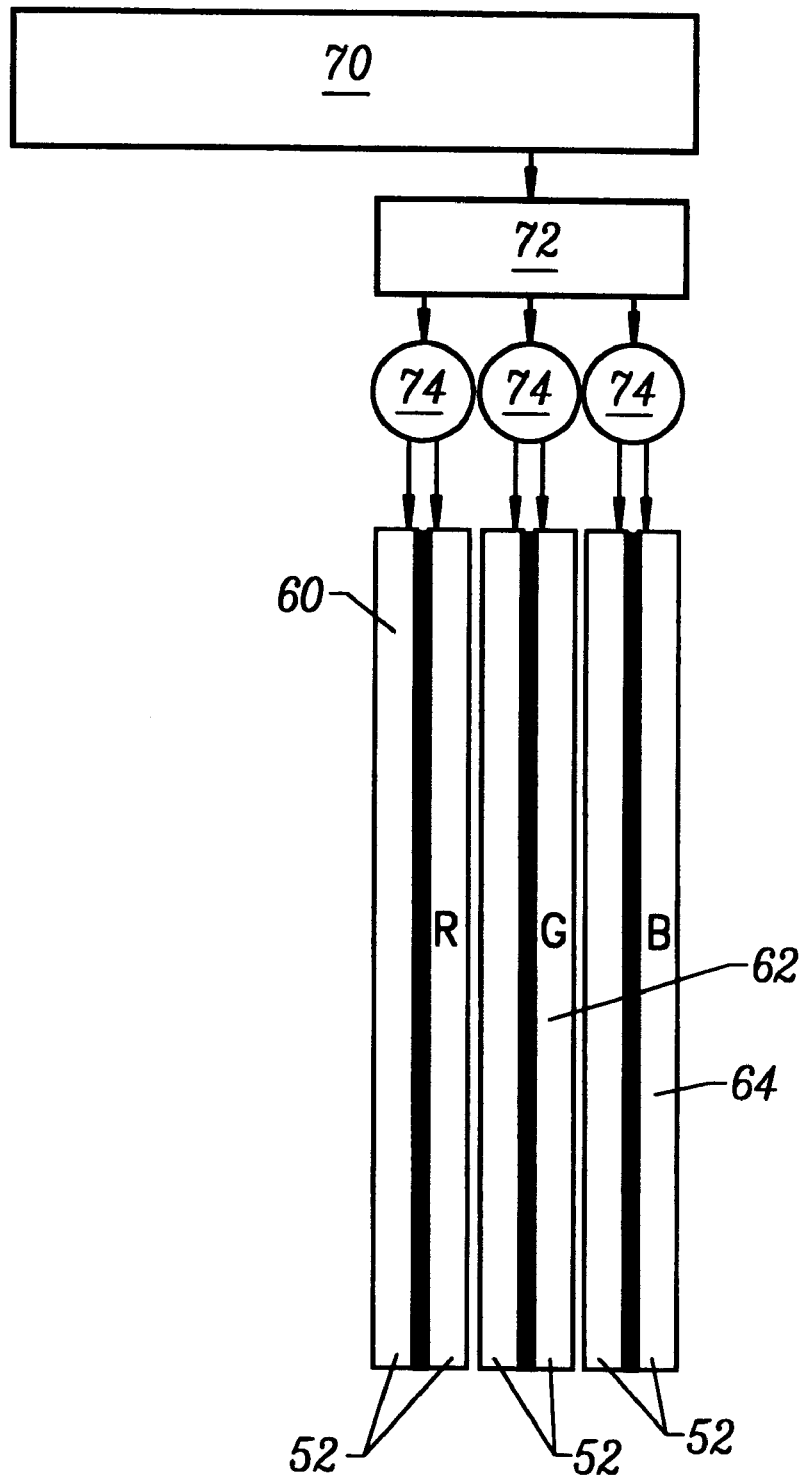
FIG. 7 is a schematic of a holographic device of the holographic display system of FIG. 1 with three holographic optical elements each optimized to diffract red, green or blue light.

Each holographic device 34, 36 includes three holographic optical elements (red 60, green 62, and blue 64) for projecting a color image to the viewer (FIG. 7). Each holographic optical element 60, 62, 64 is holographically configured such that only a particular monochromatic light is diffracted by the hologram. The red optical element 60 has a hologram which is optimized to diffract red light, the green optical element 62 has a hologram which is optimized to diffract green light, and the blue optical element 64 has a hologram which is optimized to diffract blue light. A holographic device controller 70 drives switching circuitry 74 associated with the electrodes 52 on each of the optical elements 60, 62, 64 to apply a voltage to the electrodes. The electrodes 52 are individually coupled to the device controller through a voltage controller 72 which selectively provides an excitation signal to the electrodes 52 of a selected holographic optical element, switching the hologram to the passive state. The voltage controller 72 also determines the specific voltage level to be applied to each electrode 52.

Preferably, only one pair of the electrodes 52 associated with one of the three holographic optical elements 60, 62, 64 is energized at one time. In order to display a color image, the voltage controller 72 operates to sequentially display three monochromatic images of the color input image. The electrodes 52 attached to each of the holograms 60, 62, 64 are sequentially enabled such that a selected amount of red, green, and blue light is directed towards the viewer. For example, when a red monochromatic image is projected, the voltage controller 72 switches the green and blue holograms 62, 64 to the passive state by applying voltages to their respective electrodes 52. The supplied voltages to the electrodes 52 of the green and blue holograms 62, 64 create a potential difference between the electrodes, thereby generating an electrical field within the green and blue holograms. The presence of the generated electrical field switches the optical characteristic of the holograms 62, 64 to the passive state. With the green and blue holograms 62, 64 in the passive state and the red hologram 60 in the diffractive state, only the red hologram optically diffracts the projected red image. Thus, only the portion of the visible light spectrum corresponding to the red light is diffracted to the viewer. The green hologram 62 is next changed to the diffractive state by deenergizing the corresponding electrodes 52 and the electrodes of the red hologram 60 are energized to change the red hologram to the passive state so that only green light is diffracted. The blue hologram 64 is then changed to the diffractive state by deenergizing its electrodes 52 and the electrodes of the green hologram 62 are energized to change the green hologram to the passive state so that only blue light is diffracted.

The holograms are sequentially enabled with a refresh rate which is faster than the response time of a human eye so that a color image will be created in the viewer's eye due to the integration of the red, green, and blue monochrome images created from each of the red, green, and blue holograms. Consequently, the holographic devices 34, 36 will be illuminated sequentially by red, green, and blue lights so that the final viewable image will appear to be displayed as a composite color. The red, green, and blue holographic elements 60, 62, 64 may be cycled on and off in any order.

The holographic devices 34, 36 and the eyepiece 38 form a final virtual image at a location in front of the eye and spaced a distance from the eye (FIG. 1). The eyepiece 38 is preferably also a switchable holographic device containing red, green, and blue sensitive mirrors. The eyepiece 38 may also be a nonreflective surface which acts simply as a screen to display the image for viewing by the user.

While different embodiments of the invention have been illustrated and described, it will be appreciated that various changes can be made therein without departing from the scope of the invention. For example, the system 20 can use Raman-Nath holograms rather than Bragg (thick holograms). Raman-Nath holograms are thinner and require less voltage to switch light between various modes of the hologram, however, the Raman-Nath holograms are not as efficient as the Bragg holograms.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A holographic display system comprising a left optical system and a right optical system, each optical system comprising:
   an image display operable to display an input image;
   a first holographic device operable to project the input image to at least partially overlap with the input image projected from the other of the left and right optical systems to form a first resultant image with a first aspect ratio; and
   a second holographic device operable to project the input image to at least partially overlap with the input image projected from the other of the left and right optical systems to form a second resultant image with a second aspect ratio, different from said first aspect ratio.

2. The holographic display system of claim 1 wherein the first and second holographic devices are switchable between a diffractive state in which the input image is diffracted by the holographic device and a passive state in which the input image is not diffracted by the holographic device.

3. The holographic display system of claim 2 wherein the first and second holographic devices are configured so that only one holographic device is in its diffractive state at a time.

4. The holographic display system of claim 1 wherein the left and right optical systems further comprise a lens group positioned to receive the input image from the image display and project the input image to the first and second holographic devices.

5. The holographic display system of claim 4 wherein the lens system is operable to magnify the input image.

6. The holographic display system of claim 1 wherein the holographic device comprises a hologram interposed between two electrode layers operable to apply an electrical field to the hologram.

7. The holographic display system of claim 6 wherein the hologram is formed from a polymer and liquid crystal material.

8. The holographic display system of claim 1 wherein the first and second holographic devices each comprise three holographic optical elements.

9. The holographic display system of claim 8 wherein the three holographic optical elements each have a hologram recorded therein which is optimized to diffract red, green, or blue light.

10. The holographic display system of claim 9 wherein each hologram is interposed between two electrode layers operable to apply an electrical field to the hologram to diffract the red, green, or blue light.

11. The holographic display system of claim 10 further comprising a controller operable to sequentially supply voltage to and remove voltage from the electrode layers of each holographic optical element to create a sequence of monochrome images which are combined to form a color image.

12. The holographic display system of claim 1 wherein the resultant image is a virtual image and further comprising a reflective surface for forming the virtual image at a location in front of a user of the system.

13. The holographic display system of claim 1 wherein the display system is configured for use as a head mounted display.

14. The holographic display system of claim 1 wherein the image display comprises a light source and a spatial light modulator for modulating light output from the light source to create the input image.

15. The holographic display system of claim 1 wherein the first aspect ratio is 4:3 and the second aspect ratio is 16:9.

16. A method of changing an aspect ratio in a display system comprising a first holographic system operable to display an image with a first aspect ratio and a second holographic system operable to display the image with a second aspect ratio different from said first aspect ratio, the method comprising:

switching on the first holographic system so that the holographic system diffracts light passing therethrough to form an image with said first aspect ratio; and switching off the second holographic system so that the holographic system allows light to pass therethrough without diffraction of the light.

17. The method of claim 16 wherein switching on the first holographic system comprises removing a voltage potential from the first holographic system, and switching off the second holographic system comprises applying a voltage potential to the second holographic system.

18. The method of claim 16 wherein each of the holographic systems comprises a left holographic device and a right holographic device.

19. The method of claim 18 wherein each holographic device comprises three holographic optical elements each having a hologram recorded therein and optimized to diffract red, blue, or green light and further comprising sequentially turning on and off the three holographic optical elements such that a series of monochrome images are combined to produce a color image.

20. The method of claim 16 further comprising magnifying the image by passing it through a lens group.

* * * * *